US012735011B2

(12) United States Patent
Byun

(10) Patent No.: US 12,735,011 B2
(45) Date of Patent: Sep. 15, 2026

(54) FRONT-MOUNTED TYPE RESERVOIR ASSEMBLY OF ELECTRONIC BRAKE SYSTEM

(71) Applicant: HL MANDO CORPORATION, Gyeonggi-do (KR)

(72) Inventor: Seunghwan Byun, Seoul (KR)

(73) Assignee: HL MANDO CORPORATION, Gyeonggi-do (KR)

(*) Notice: Subject to any disclaimer, the term of this patent is extended or adjusted under 35 U.S.C. 154(b) by 338 days.

(21) Appl. No.: 18/623,543

(22) Filed: Apr. 1, 2024

(65) Prior Publication Data

US 2024/0326766 A1 Oct. 3, 2024

(30) Foreign Application Priority Data

Mar. 31, 2023 (KR) ........................ 10-2023-0042662

(51) Int. Cl.

*B60T 11/26* (2006.01)
*B60T 13/14* (2006.01)
*B60T 13/68* (2006.01)
*B60T 17/04* (2006.01)
*B60T 17/06* (2006.01)

(52) U.S. Cl.

CPC .......... *B60T 13/142* (2013.01); *B60T 13/148* (2013.01); *B60T 13/686* (2013.01); *B60T 17/04* (2013.01); *B60T 17/06* (2013.01)

(58) Field of Classification Search

CPC ...... B60T 11/26; B60T 16/148; B60T 13/686; B60T 13/142; B60T 17/04; B60T 17/06
See application file for complete search history.

(56) References Cited

U.S. PATENT DOCUMENTS

| | | | | |
|---|---|---|---|---|
| 9,956,942 | B2 * | 5/2018 | Koshimizu | B60T 11/26 |
| 11,052,890 | B2 * | 7/2021 | Spencer | B60T 11/26 |
| 11,273,814 | B2 * | 3/2022 | Alili | B60T 11/26 |
| 11,535,219 | B2 * | 12/2022 | Sakakibara | F16D 25/12 |
| 11,820,340 | B2 * | 11/2023 | Park | B60T 17/06 |
| 12,370,993 | B2 * | 7/2025 | Byun | B60T 11/26 |
| 2016/0251006 | A1 * | 9/2016 | Koshimizu | B60T 11/26 206/459.1 |
| 2020/0262405 | A1 * | 8/2020 | Weh | B60T 11/22 |
| 2020/0290582 | A1 * | 9/2020 | Spencer | B60T 11/26 |
| 2023/0021175 | A1 * | 1/2023 | Hirsemann | B60T 17/06 |

(Continued)

FOREIGN PATENT DOCUMENTS

| | | |
|---|---|---|
| JP | 2006-264429 | 10/2006 |
| JP | 6681124 | 4/2020 |

(Continued)

*Primary Examiner* — Thomas W Irvin

(74) *Attorney, Agent, or Firm* — WOMBLE BOND DICKINSON (US) LLP

(57) ABSTRACT

A front-mounted type reservoir assembly installed on a front of a hydraulic block of an integrated brake system may include a main reservoir tank provided with a main reservoir chamber in which brake oil is stored, and provided with a plurality of oil ports through which the brake oil flows in and out on a first surface facing the front of the hydraulic block, wherein the plurality of oil ports includes a first oil port, a second oil port and a third oil port, and the third oil port is disposed at a position lower than the first oil port and the second oil port on the first surface.

20 Claims, 9 Drawing Sheets

(56) References Cited

U.S. PATENT DOCUMENTS

2023/0356700 A1* 11/2023 Jia ......................... B60T 8/4081
2023/0382362 A1* 11/2023 Byun ...................... B60T 17/06
2024/0391444 A1* 11/2024 Song ..................... B60T 13/745
2025/0162559 A1* 5/2025 Song ....................... B60T 15/02
2026/0070529 A1* 3/2026 Byun .................... B60T 13/142
2026/0084672 A1* 3/2026 Byun ...................... B60T 11/26
2026/0103175 A1* 4/2026 Song ....................... B60T 11/26

FOREIGN PATENT DOCUMENTS

KR 10-2023-0045346 4/2023
WO WO-2023153912 A1 * 8/2023 ............ B60T 13/142

* cited by examiner

FRONT-MOUNTED TYPE RESERVOIR ASSEMBLY OF ELECTRONIC BRAKE SYSTEM

CROSS-REFERENCE TO RELATED APPLICATION

This application claims the benefit of Korean Patent Application No. 10-2023-0042662, filed on Mar. 31, 2023, in the Korean Intellectual Property Office, the disclosure of which is incorporated herein by reference.

BACKGROUND

1. Field

Embodiments of the present disclosure relate to a front-mounted type reservoir assembly of an electronic brake system, and more specifically, to a front-mounted type reservoir assembly of an electronic brake system capable of being firmly mounted on a front of a hydraulic block.

2. Description of the Related Art

In vehicles, a brake system for braking is necessarily installed, and various types of brake systems have been suggested for the safety of drivers and passengers.

In brake systems in the related art, a method in which, when a driver presses a brake pedal, hydraulic pressure required for braking is supplied to a wheel cylinder using a mechanically connected booster is mainly used. However, as a market demand to implement various braking functions in detailed response to a vehicle operating environment increases, integrated dynamic brake (IDB) systems that receive a driver's intention to brake as an electrical signal from a pedal displacement sensor for detecting a displacement of a brake pedal when the driver presses the brake pedal and operate a hydraulic pressure generating device based on the electrical signal so that hydraulic pressure required for braking is supplied to a wheel cylinder have recently been widely spread.

In the integrated brake system, a master booster and an electronic stability control (ESC) are integrated, which makes it possible to generate a stable and powerful braking force. The integrated brake system generally includes a configuration in which a motor is operated by outputting the operation of a brake pedal as an electrical signal through a pedal displacement sensor, a piston pump of the hydraulic pressure generating device generates braking hydraulic pressure according to the operation of the motor, and the hydraulic pressure is transmitted to each of the wheels under the control of an electronic control unit. In addition, a master cylinder is provided in a hydraulic block in which a hydraulic circuit is formed so that a pedal force of the brake pedal is directly transmitted to the wheel cylinder when the system abnormally operates.

In order to perform braking through the integrated brake system, a reservoir for providing brake oil to the integrated brake system is provided. Generally, the reservoir stores brake oil therein and is coupled to an upper portion of a master cylinder.

In addition, the reservoir may be connected to the piston pump provided in the hydraulic pressure generating device of the integrated brake system to generate the hydraulic pressure by the piston pump.

The reservoir is installed in various ways to supply brake oil to the integrated brake system, but there is a problem that installation thereof is difficult in a limited space of a vehicle.

In particular, there is a risk of fire when brake oil leaked from the reservoir flows into a connector provided in the electronic control unit of the electronic brake system.

FIG. 9 illustrates an assembly structure of an electronic brake system in the related art.

As illustrated in FIG. 9, an electronic brake system 1 has a mechanical structure in which a master cylinder 2, an actuator 4, and an electronic control unit 8 are assembled to one hydraulic block 7.

The electronic control unit 8 is provided with a connector 9 for connection to an external device. In order to easily connect the connector 9 when a vehicle is equipped with the electronic brake system and to prevent brake oil from flowing into the connector 9, it is desirable to provide the connector 9 on an upper side of the electronic control unit 8. However, when the connector 9 is provided on the upper side of the electronic control unit 8 in this way, the connector 9 may be obscured by a reservoir 6 coupled to the hydraulic block 7.

In order to prevent the obscuring, in the electronic brake system 1 in the related art, the reservoir 6 is connected to the hydraulic block 7 using a connector 5. However, when the connector 5 is used in this way, there is a problem in that a separate connector 5 has to be manufactured and separate bolts for coupling the connector 5 and the hydraulic block 7 and the connector 5 and reservoir 6 are required.

SUMMARY

Therefore, it is an aspect of the present disclosure to provide a front-mounted type reservoir assembly of an electronic brake system capable of being firmly mounted on a front of a hydraulic block.

In accordance with one aspect of the present disclosure, a front-mounted type reservoir assembly installed on a front of a hydraulic block of an integrated brake system includes a main reservoir tank provided with a main reservoir chamber in which brake oil is stored, and provided with a plurality of oil ports through which the brake oil flows in and out on a first surface facing the front of the hydraulic block, a first flange in which at least one first through-hole through which a first mounting bolt extending from the first surface and coupled to the front of the hydraulic block is coupled is formed, and a second flange in which at least one second through-hole through which a second mounting bolt extending from a second surface facing a top surface of the hydraulic block and coupled to the top surface of the hydraulic block is coupled is formed, and a mounting bush with which the first mounting bolt is in contact is provided at an edge of the first through-hole.

The mounting bush may include a metallic material.

The mounting bush may be formed integrally with the first flange through insert injection.

The mounting bush may have a separation prevention protrusion formed on an outer peripheral surface thereof.

The mounting bush may be disposed so that a first end in contact with the front of the hydraulic block is aligned with the first surface.

The mounting bush may be disposed so that a second end opposite to the first end protrudes from the first flange.

The second flange may be spaced apart from the top surface of the hydraulic block and coupled to the hydraulic block by the second mounting bolt.

The second mounting bolt may include a threaded portion and a head portion, and the head portion may include a protrusion formed on an end, and a connecting portion that connects the protrusion and the threaded portion and has a diameter smaller than the protrusion.

The second through-hole may include a large diameter portion formed on an upper side and a small diameter portion that is formed on a lower side with an inner peripheral surface having a diameter smaller than an inner peripheral surface of the large diameter portion, the small diameter portion may have a diameter larger than the connecting portion and smaller than the protrusion, and the large diameter portion may have a diameter larger than the protrusion.

The small diameter portion may have a height lower than an axial length of the connecting portion.

At least one partition wall may be provided in the main reservoir tank to partition the main reservoir chamber into a plurality of parts, and the main reservoir chamber may be provided with a first reservoir chamber formed between an inner wall of the main reservoir tank and a first partition wall, a second reservoir chamber formed between the inner wall of the main reservoir tank and a second partition wall, and a third reservoir chamber formed between the first partition wall and the second partition wall.

The plurality of oil ports may include a first oil port provided to communicate with the first reservoir chamber, a second oil port provided to communicate with the second reservoir chamber, and a third oil port provided to communicate with the third reservoir chamber.

The third oil port may be disposed at a position lower than the first oil port and the second oil port on the first surface.

The first oil port and the second oil port may be disposed at different heights on the first surface.

The first oil port and the second oil port may be connected to a first master chamber and a second master chamber of the master cylinder that are formed in the hydraulic block, respectively, when mounted on the hydraulic block, and the third oil port may be connected to a hydraulic pressure generating device formed on the hydraulic block when mounted on the hydraulic block.

The main reservoir tank may be formed of a resin material by injection molding.

In accordance with another aspect of the present disclosure, an electronic brake system includes a hydraulic block in which a plurality of accommodating bores where a master cylinder, a plurality of valves, and a hydraulic pressure generating device are installed to control braking hydraulic pressure supplied to a wheel cylinder installed on each wheel of a vehicle and a flow path connecting each accommodating bore are formed, a front-mounted type reservoir assembly installed on a front of the hydraulic block, and an electronic control unit coupled to one side of the hydraulic block, the front-mounted type reservoir assembly includes a main reservoir tank provided with a main reservoir chamber in which brake oil is stored, and provided with a plurality of oil ports through which the brake oil flows in and out on a first surface facing the front of the hydraulic block, a first flange in which at least one first through-hole through which a first mounting bolt extending from the first surface and coupled to the front of the hydraulic block is coupled is formed, and a second flange in which at least one second through-hole through which a second mounting bolt extending from a second surface facing a top surface of the hydraulic block and coupled to the top surface of the hydraulic block is coupled is formed, and a mounting bush with which the first mounting bolt is in contact is provided at an edge of the first through-hole.

The electronic control unit may be provided with a connector that is electrically connected to an external device, and the connector may be disposed above the hydraulic block.

The mounting bush may include a metallic material.

The second flange may be spaced apart from the top surface of the hydraulic block and coupled to the hydraulic block by the second mounting bolt.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
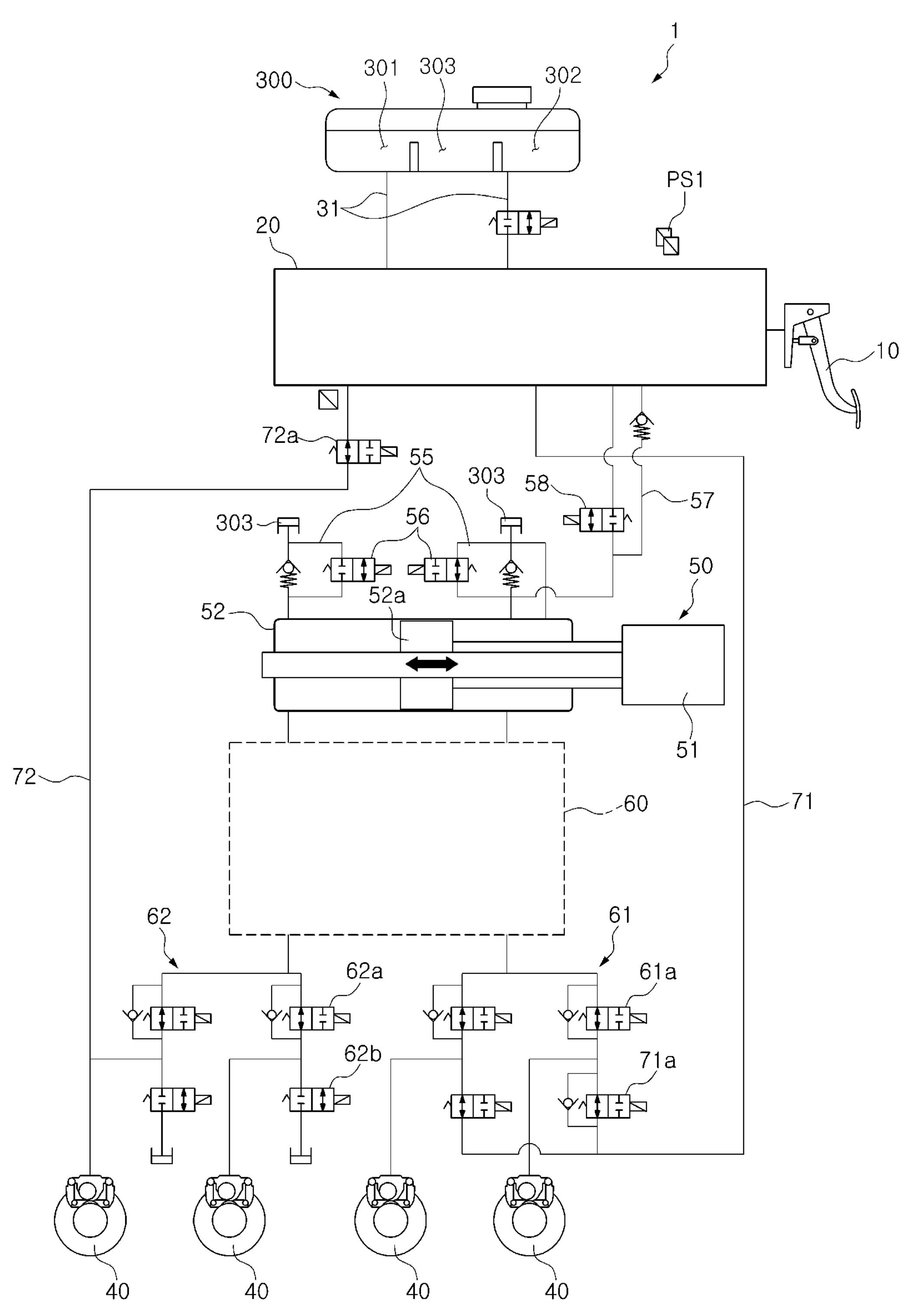
FIG. 1 is a view schematically showing one example of an electronic brake system according to one embodiment of the present disclosure.

Hereinafter, exemplary embodiments of the present disclosure will be described in detail with reference to the accompanying drawings. The following embodiments are provided to completely convey the spirit of the present disclosure to those skilled in the art to which the present disclosure pertains. The present disclosure is not limited to the embodiments shown herein and may be embodied in other forms. In the drawings, parts that bear no relation to descriptions may be omitted in order to clarify the present disclosure, and elements may be exaggerated in sizes thereof for ease of understanding.

Hereinafter, a working principle and embodiments of the present disclosure will be described with reference to the accompanying drawings.

FIG. 1 is a view schematically showing one example of an electronic brake system according to one embodiment of the present disclosure.

Referring to the drawing, an electronic brake system 1 according to the present embodiment may include a reservoir assembly 300 that stores a pressurized medium such as oil or the like therein, a master cylinder 20 that provides a reaction force according to a pedal force of a brake pedal 10 to a driver and, at the same time, pressurizes and discharges brake oil contained therein, a wheel cylinder 40 to which the hydraulic pressure of the brake oil is transmitted and which performs braking of each wheel (RR, RL, FR, and FL), an actuator 50 that receives a driver's intention to brake as an electrical signal by a pedal displacement sensor PS1 for detecting the displacement of the brake pedal 10 and the generates hydraulic pressure of the brake oil through mechanical operation, a hydraulic control unit 60 that controls the hydraulic pressure transmitted to the wheel cylinder 40, and an electronic control unit (ECU) 80 that controls the actuator 50 and various valves based on the hydraulic pressure information and the pedal displacement information.

The master cylinder 20 is provided to provide a stable pedal feel by providing a reaction force against a pedal force to the driver when the driver applies the pedal force to the brake pedal 10 for a braking operation, and at the same time, pressurize and discharge the brake oil accommodated therein. To this end, the master cylinder 20 may be provided with a simulation unit (not illustrated) that provides a pedal feel to the driver and a master cylinder unit (not illustrated) that pressurizes and discharges the brake oil accommodated therein by the pedal force of the brake pedal. Although not illustrated in detail, the simulation unit and the master cylinder unit may be of an integrated type coaxially disposed within one housing, or may be separately provided and combined. To describe further, the master cylinder unit includes at least one master chamber (usually two) inside the housing, and in the master chamber, a master piston connected to the brake pedal pressurizes and discharges brake oil while moving forward and backward. The simulation unit is in conjunction with the master piston, and is made of, for example, an elastic material to provide the pedal feel of the brake pedal to the driver through an elastic restoring force.

The reservoir assembly 300 is connected to the master cylinder 20 through reservoir flow paths 31. Each reservoir flow path 31 may be connected to at least one master chamber. The interior of the reservoir assembly 300 may be divided into a plurality of parts by partition walls, and may be selectively connected to the master chamber, the wheel cylinder, the actuator, or the like. By separating the interior of the reservoir assembly 300 in this way, for example, even in an emergency when brake oil is not properly supplied to the actuator 50, the reservoir assembly 300 may normally supply brake oil to the chamber of the master cylinder, thereby performing emergency braking. Alternatively, internal spaces of the separated reservoir (reservoir chambers 301, 302, and 303) may separately connect the master chamber and the wheel cylinder, thereby allowing at least some to form normal braking pressure even in the event of malfunction.

The wheel cylinder 40 will be described in more detail in the hydraulic control unit 60 that controls hydraulic pressure transmitted to four wheels, which will be described below.

The actuator 50 is a normal hydraulic pressure supply device that receives a driver's intention to brake as an electrical signal from the pedal displacement sensor for detecting the displacement of the brake pedal 10 and generates the hydraulic pressure of the brake oil through a mechanical operation. To this end, the actuator 50 may include a drive unit 51 that operates by the electrical signal from the pedal displacement sensor and a hydraulic pressure generating device 52 that provides pressure to the brake oil transmitted to the wheel cylinder 40 by a motor operation of the drive unit.

A motor 53 of the drive unit 51 is provided to operate a piston 52*a* of the hydraulic pressure generating device 52 by an electrical signal output from the electronic control unit 80. The motor 53 may be provided to include a stator and a rotor and may provide power for generating a displacement of the piston 52*a* by rotating in a forward or reverse direction through the stator and the rotor. A rotational angular velocity and rotation angle of the motor may be precisely controlled by a motor control sensor. Since the motor is a well-known technology, a detailed description thereof will be omitted.

The hydraulic pressure generating device 52 may include, for example, a ball screw nut that converts a rotational force resulting from the operation of the motor of the drive unit 51 into a linear motion, and a linear pump pressurized by the ball screw nut. That is, the actuator 50 generates braking pressure by driving the motor according to the electrical signal from the pedal displacement sensor and moving the piston of the linear pump forward and backward.

A dump flow path 55 and a dump valve 56 that control the flow of the pressurized medium may be provided between the actuator 50 and the reservoir assembly 300, and in addition, an inspection flow path 57 and an inspection valve 58 for checking for leaks may be provided between the actuator 50 and the master cylinder 20.

The hydraulic control unit 60 may include a first hydraulic circuit 61 and a second hydraulic circuit 62 that receive hydraulic pressure from the actuator 50 and each control two wheels. As one example, the first hydraulic circuit 61 may control a right front wheel (FR) and a left rear wheel (RL), and the second hydraulic circuit 62 may control a left front wheel (FL) and a right rear wheel (RR). The wheel cylinder 40 is installed on each wheel (FR, FL, RR, and RL) and receives hydraulic pressure, so that braking is performed. More specifically, the hydraulic control unit 60 may include inlet valves 61*a* and 62*a* provided at the front of each wheel cylinder 40 to control hydraulic pressure, and an outlet valve 62*b* branched between the inlet valve and the wheel cylinder 40 and connected to the reservoir 30.

In addition, the electronic brake system 1 according to the present embodiment may further include backup flow paths 71 and 72 for implementing braking by the driver directly supplying the brake oil discharged from the master cylinder 20 to the wheel cylinder 40 when the actuator 50 does not normally operate. At least one cut valve 71*a* or 72*a* may be provided on the backup flow paths 71 and 72 to control the flow of the pressurized medium between the wheel cylinder 40 and the master cylinder 20.

Since the braking and braking release operations of the electronic brake system having the above-described structure are known techniques, detailed descriptions thereof will be omitted.

Figure 2:
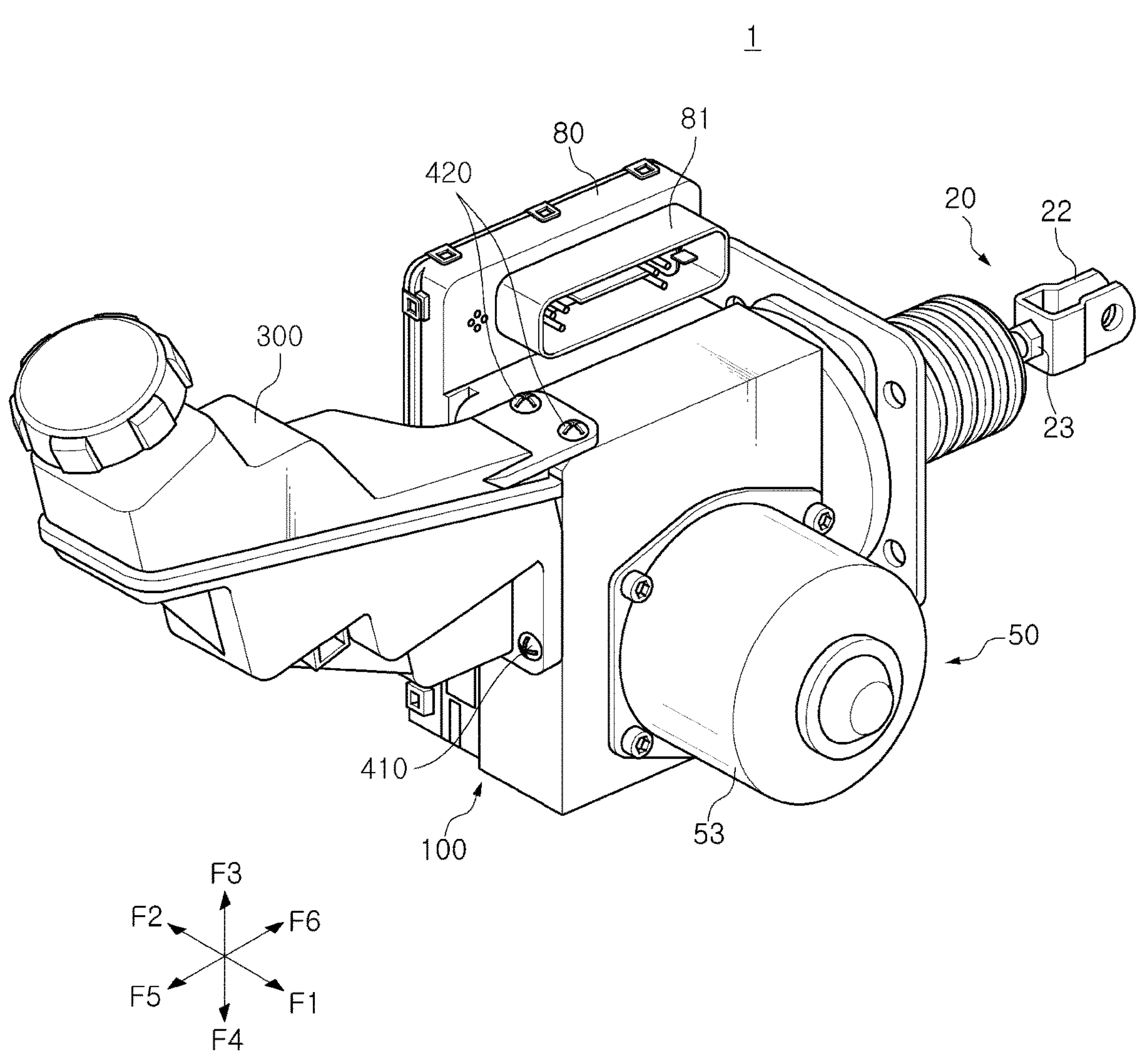
FIG. 2 is a combined perspective view illustrating an assembly structure of the electronic brake system according to one embodiment of the present disclosure.
Figure 3:
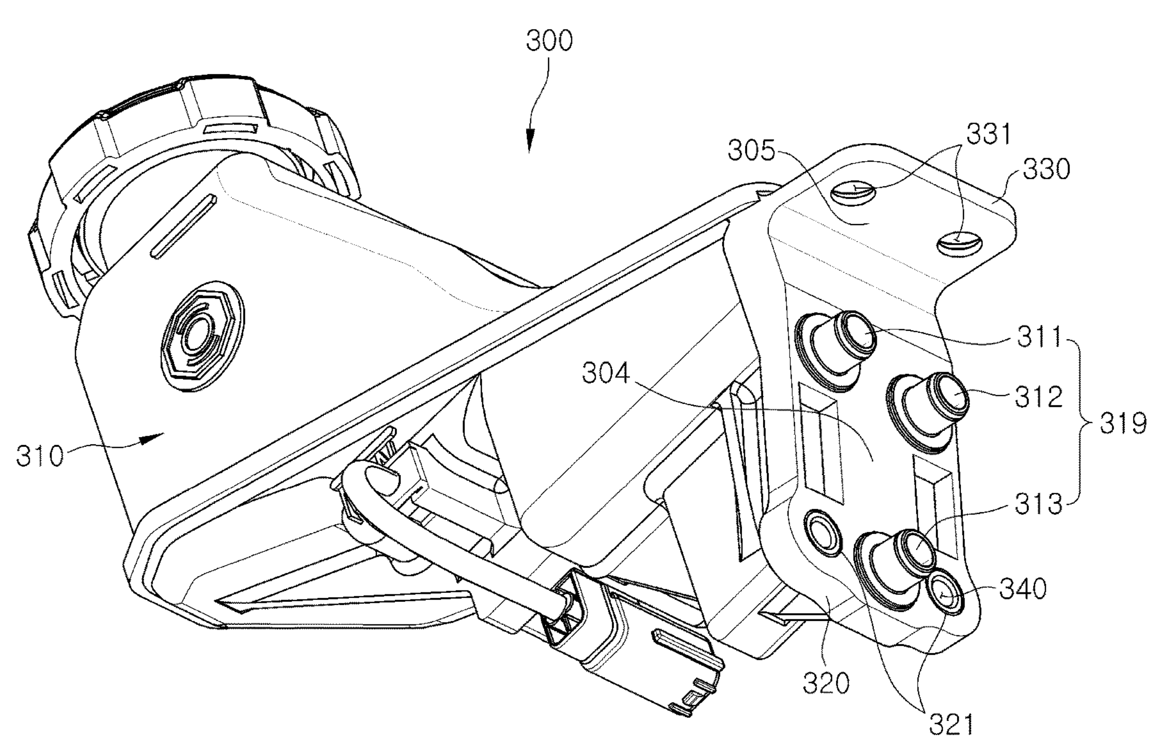
FIG. 3 is a perspective view illustrating a front-mounted type reservoir assembly according to one embodiment of the present disclosure.
Figure 4:
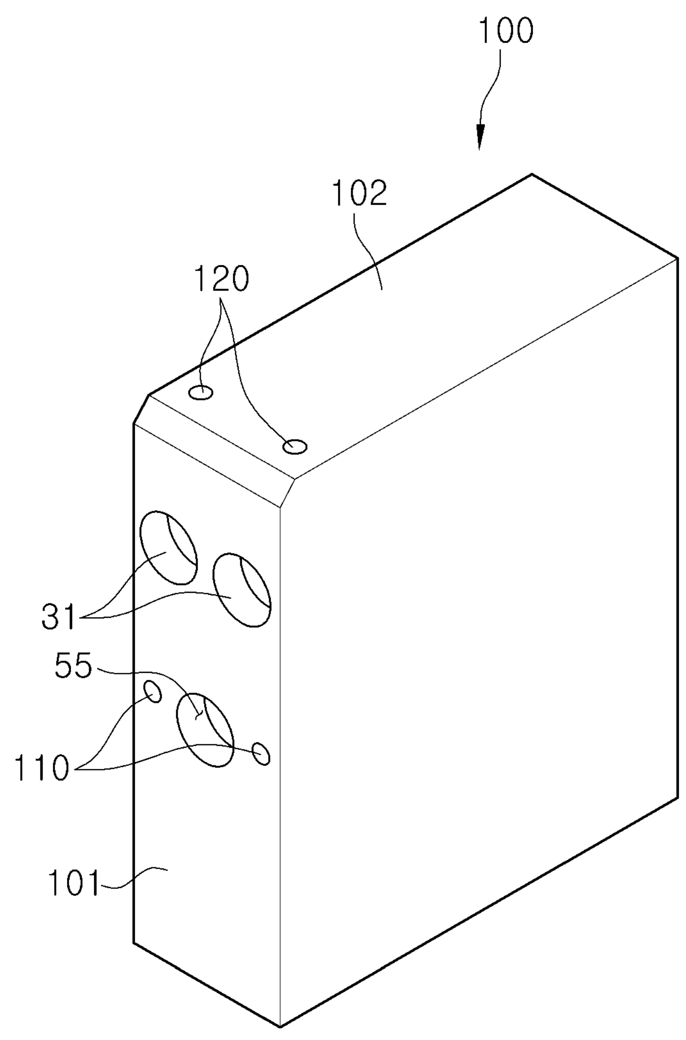
FIG. 4 is a perspective view illustrating a hydraulic block according to one embodiment of the present disclosure.

FIG. 2 is a combined perspective view illustrating an assembly structure of the electronic brake system according to one embodiment of the present disclosure, FIG. 3 is a perspective view illustrating a front-mounted type reservoir assembly according to one embodiment of the present disclosure, and FIG. 4 is a perspective view illustrating a hydraulic block according to one embodiment of the present disclosure.

Referring to FIGS. 2 to 4, the electronic brake system 1 of the present embodiment has a mechanical structure in which the above-mentioned master cylinder 20, reservoir assembly 300, actuator 50, and electronic control unit 80 are assembled to one hydraulic block 100.

As illustrated, the hydraulic block 100 has a rectangular parallelepiped shape. Here, in order to help understand the present disclosure, two sides F1 and F2, a top side F3, a bottom side F4, a front side F5, and a back side F6 showing directions of the hydraulic block 100 are set based on the hydraulic block 100 illustrated in FIG. 2, and the present disclosure is not limited thereto and sides showing the directions may change depending on a position where the hydraulic block 100 is installed.

The hydraulic block 100 serves to transmit braking hydraulic pressure (hydraulic pressure) generated from the master cylinder 20 or the actuator 50 to the wheel cylinder 40 provided at each wheel. To this end, various sensors and a plurality of flow paths are formed in the hydraulic block 100 to control the braking hydraulic pressure transmitted to the wheel cylinder 40, and a plurality of valves are installed at appropriate locations on the plurality of flow paths. To this end, the hydraulic block 100 may be provided with a plurality of accommodating bores (not illustrated) where the master cylinder 20, the plurality of valves, and the hydraulic pressure generating device 52 are installed.

Meanwhile, the electronic control unit 80 may control various valves installed in the hydraulic block 100, and the motor 53 and the pump of the actuator 50 based on hydraulic pressure information and pedal displacement information.

Specifically, as illustrated, the electronic control unit 80 may be coupled at one side F2 of the hydraulic block 100, the reservoir assembly 300 may be provided at the front side F5, and the master cylinder 20 may be provided at the back side F6. Although FIG. 2 illustrates only a clevis 22 through which the master cylinder 20 is coupled to the brake pedal 10 and an input shaft 23 coupled to the clevis 22, specific configurations of the master cylinder 20, such as the master chamber, master piston, simulator, and the like, are generally well-known technologies, and thus detailed descriptions thereof will be omitted. The reservoir assembly 300 provides brake oil to the master cylinder 20 or the actuator 50 through an internal flow path of the hydraulic block 100.

The motor 53 corresponding to the drive unit 51 of the actuator 50 is coupled at the other side F1 of the hydraulic block 100. The motor 53 converts rotational force into a linear motion by a power conversion unit (not illustrated) connected through the interior of the hydraulic block 100 and is connected to the hydraulic pressure generating device 52 at the same time.

In order to assemble the motor 53, at the side F1 of the hydraulic block 100, a motor accommodating bore (not illustrated) for coupling the motor 53 and a connector accommodating bore (not illustrated) for connecting a motor connector to the electronic control unit 80 are provided.

The electronic control unit 80 may be provided with a connector 81 that is electrically connected to an external device. As illustrated in FIG. 2, the connector 81 may be disposed at the top side F3 of the hydraulic block 100.

According to the present embodiment, since the reservoir assembly 300 is provided at the front side F5 of the hydraulic block 100, and the connector 81 is disposed at the top side F3 of the hydraulic block 100, when connecting a harness to the electronic brake system 1 mounted on the vehicle, workers may easily access the connector 81 and easily assemble the harness.

According to the present embodiment, the reservoir assembly 300 is installed on a front 101 of the hydraulic block 100. The reservoir assembly 300 stores brake oil therein and provides the brake oil to the master cylinder 20 or the actuator 50.

Referring to FIGS. 2 to 4, the reservoir assembly 300 according to the present embodiment includes a main reservoir tank 310 provided with a main reservoir chamber in which brake oil is stored, and provided with a plurality of oil ports 319 through which the brake oil flows in and out on a first surface 304 facing the front 101 of the hydraulic block 100, a first flange 320 in which at least one first through-hole 321 through which a first mounting bolt 410 extending from the first surface 304 and coupled to the front 101 of the hydraulic block 100 is coupled is formed, and a second flange 330 in which at least one second through-hole 331 through which a second mounting bolt 420 extending from a second surface 305 facing a top surface 102 of the hydraulic block 100 and coupled to the top surface 102 of the hydraulic block 100 is coupled is formed.

The main reservoir tank 310 is provided with the main reservoir chamber in which brake oil is stored. The main reservoir chamber is a space formed therein when a main upper body and a main lower body of the main reservoir tank 310 are coupled. Accordingly, the main reservoir chamber may store brake oil supplied to the electronic brake system 1.

In this way, the main upper body and the main lower body that constitute the main reservoir tank may be formed of a resin material by injection molding. The main upper body and the main lower body may be coupled by heat fusion to form one body.

In the present embodiment, the plurality of oil ports 319 are provided on the first surface 304 facing the front 101 of the hydraulic block 100 and coupled to connection ports provided on the front 101 of the hydraulic block 100.

In the present embodiment, the plurality of oil ports 319 may include first to third oil ports 311, 312, and 313. The first to third oil ports 311, 312, and 313 may be provided to communicate with first to third reservoir chambers 301, 302, and 303 divided by partition walls, respectively. Correspondingly, on the front 101 of the hydraulic block 100, a pair of reservoir connection ports connected to the reservoir flow paths 31 communicating with the master chamber of the master cylinder 20 and a reservoir connection port connected to the dump flow path 55 communicating with the hydraulic pressure generating device 52 may be provided.

In this case, since the connector 81 of the electronic control unit 80 is disposed at the top side F3 of the hydraulic block 100, even when brake oil leaks between the oil port 319 of the reservoir assembly 300 and the connection port of the hydraulic block 100 during an operation such as bleeding or the like, the brake oil does not flow into the connector 81.

The reservoir assembly 300 may be mounted on the hydraulic block 100 by including the first flange 320 extending from the first surface 304 and the second flange 330 extending from the second surface 305.

The first flange 320 may extend from the first surface 304 facing the front 101 of the hydraulic block 100, and may be coupled to the front 101 of the hydraulic block 100 through the first mounting bolt 410.

The second flange 330 may extend from the second surface 305 facing the top surface 102 of the hydraulic block 100, and may be coupled to the top surface 102 of the hydraulic block 100 through the second mounting bolt 420.

In this way, the reservoir assembly 300 according to the present embodiment may be firmly coupled by being coupled to the two surfaces 101 and 102 of the hydraulic block 100.

The first through-hole 321 and the second through-hole 331 through which the first mounting bolt 410 and the second mounting bolt 420 are coupled are formed in the first flange 320 and the second flange 330, respectively.

Correspondingly, a first mounting hole 110 and a second mounting hole 120 may be provided on the front 101 and to the top surface 102 of the hydraulic block 100, respectively.

The plurality of oil ports 319 through which brake oil flows in and out are provided on the first surface 304 of the reservoir assembly 300. Therefore, the first surface 304 needs to be firmly fixed in close contact with the front 101 of the hydraulic block 100.

In this case, when the first mounting bolt 410 made of a metallic material is directly coupled to and contacts the first through-hole 321 of the reservoir assembly 300 made of a resin material, a bolt fastening force may decrease and the bolt may become loose due to wear of the first through-hole 321 by vibration of the vehicle.

In the present embodiment, a mounting bush 340 including a metallic material is provided in the first through-hole 321 so that the first mounting bolt 410 is prevented from directly contacting the first flange 320. The mounting bush 340 will be described below.

Figure 5:
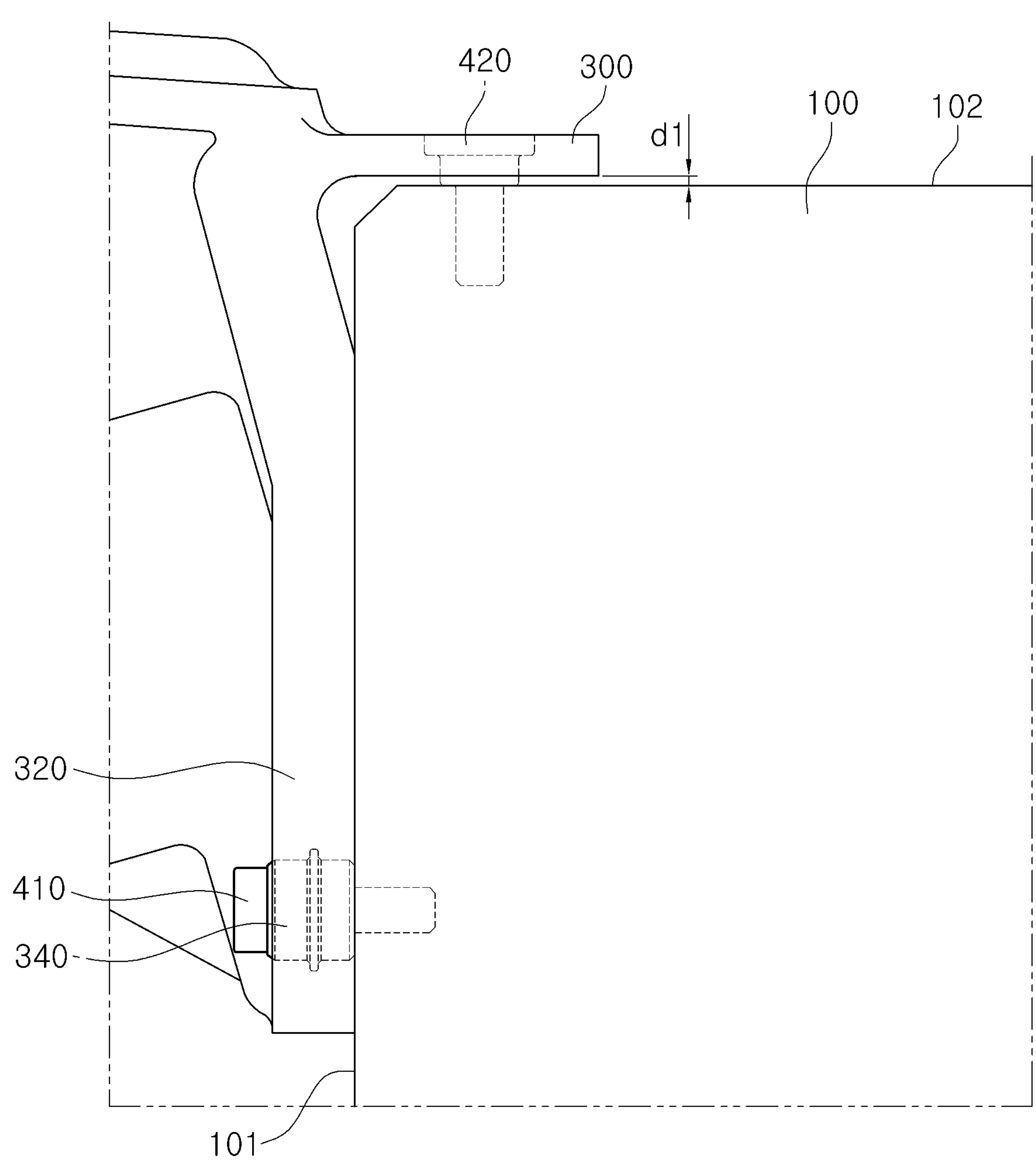
FIG. 5 is a side view illustrating a mounting structure of a front-mounted type reservoir assembly and a hydraulic block according to one embodiment of the present disclosure.
Figure 6:
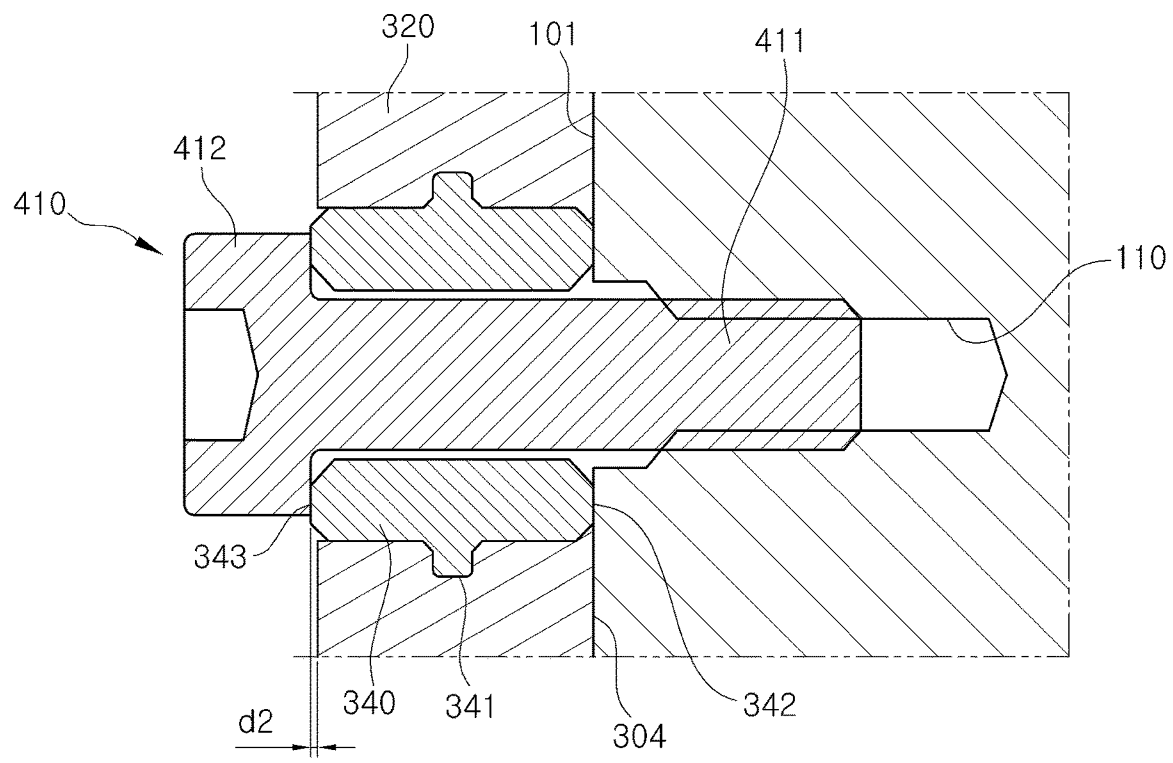
FIG. 6 is a cross-sectional view illustrating a mounting structure of a first mounting bolt according to one embodiment of the present disclosure.
Figure 7:
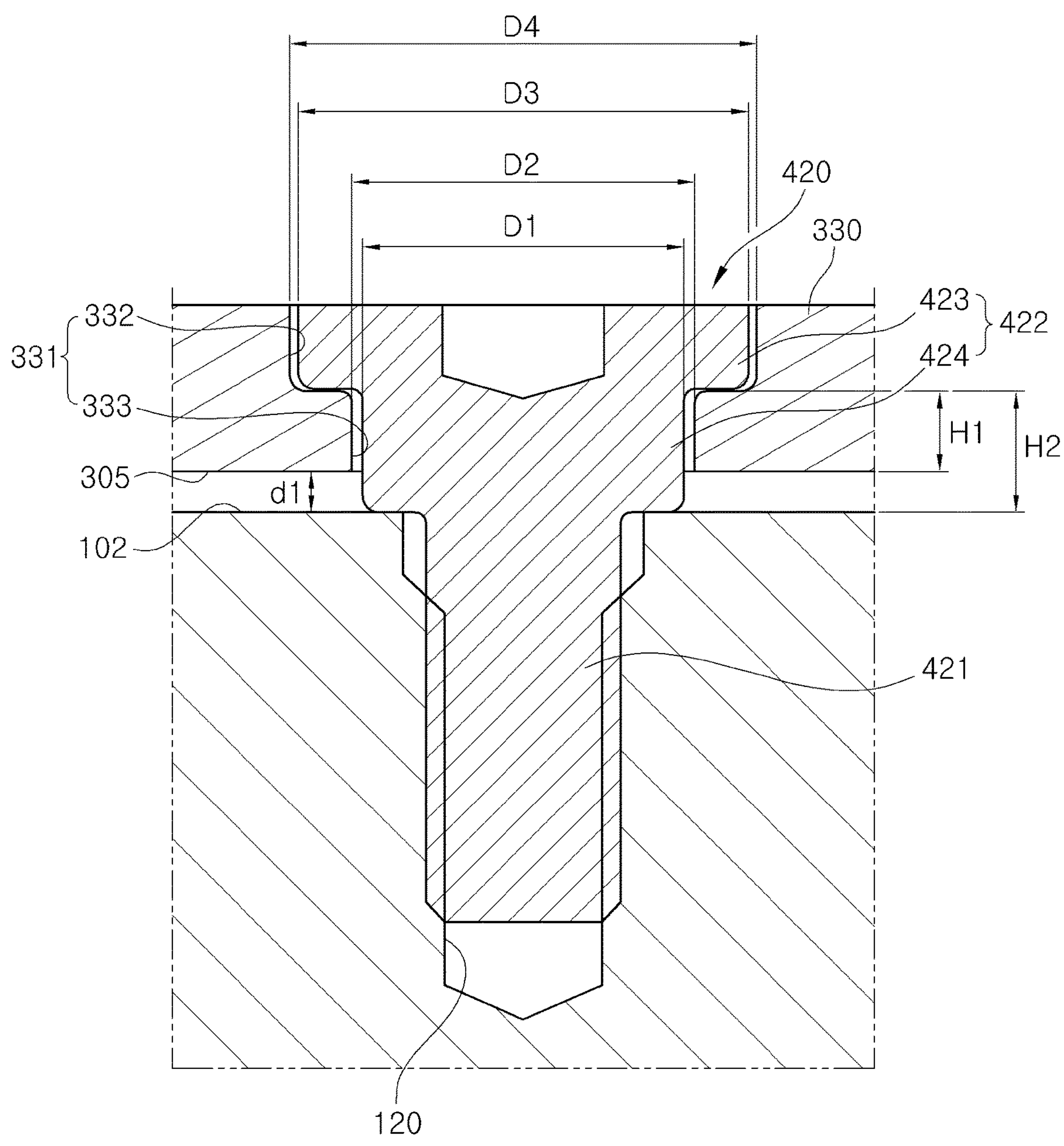
FIG. 7 is a cross-sectional view illustrating a mounting structure of a second mounting bolt according to one embodiment of the present disclosure.

FIG. 5 is a side view illustrating a mounting structure of a front-mounted type reservoir assembly and a hydraulic block according to one embodiment of the present disclosure, and FIGS. 6 and 7 are cross-sectional views illustrating mounting structures of a first mounting bolt and a second mounting bolt according to one embodiment of the present disclosure, respectively.

FIGS. 5 to 7 illustrate a mounting structure of the reservoir assembly 300 and the hydraulic block 100 in an enlarged manner.

Referring to FIGS. 5 and 6, a coupling structure of the first flange 320 of the reservoir assembly 300 and the front 101 of the hydraulic block 100 may be confirmed.

The mounting bush 340 with which the first mounting bolt 410 is in contact is provided at an edge of the first through-hole 321 provided in the first flange 320. The mounting bush 340 may prevent the first mounting bolt 410 from directly contacting the first flange 320 by being provided at the edge of the first through-hole 321.

The mounting bush 340 may include a metallic material. Since the mounting bush 340 includes a metallic material, the hydraulic block 100 and the mounting bush 340 are in metallic contact, and the mounting bush 340 and a head portion 412 of the first mounting bolt 410 are in metallic contact. Meanwhile, a threaded portion 411 of the first mounting bolt 410 is screw-coupled to the first mounting hole 110 of the hydraulic block 100. Since the hydraulic block 100, the mounting bush 340, and the first mounting bolt 410 are in metallic contact in this way, a coupling force of the first mounting bolt 410 coupled to the first mounting hole 110 may be maintained, and it is possible to prevent the first mounting bolt 410 from wearing out the first flange 320 due to vibration.

The mounting bush 340 may be formed integrally with the first flange 320 through insert injection. The mounting bush 340 may be firmly coupled to the first flange 320 by being integrally formed with the first flange 320 through insert injection.

In this case, the mounting bush 340 may have a separation prevention protrusion 341 formed on an outer peripheral surface. When the first flange 320 is formed by molding the mounting bush 340 on which the separation prevention protrusion 341 is formed through insert injection, a recess corresponding to the separation prevention protrusion 341 is formed on an inner peripheral surface of the first through-hole 321, so that the mounting bush 340 may be firmly coupled to the first flange 320.

In the mounting bush 340 according to the present embodiment, a first end 342 contacting the front 101 of the hydraulic block 100 is aligned with a first surface 304, and a second end 343 opposite to the first end 342 is disposed to protrude from the first flange 320.

The first end 342 of the mounting bush 340 is disposed to be aligned with the first surface 304. In the present embodiment, since the first end 34 is aligned with the first surface 304, the first surface 304 of the reservoir assembly 300 may be assembled in close contact with the front 101 of the hydraulic block 100. Since the first surface 304 is in close contact with the front 101 of the hydraulic block 100 in this way, the plurality of oil ports 319 provided on the first surface 304 may be closely coupled to the reservoir connection port provided on the front 101 of the hydraulic block 100, thereby preventing brake oil leakage.

In addition, since the first end 34 is aligned with the first surface 304, the first end 34 may be brought into metallic contact with the front 101 of the hydraulic block 100.

Meanwhile, the second end 343 may be disposed to protrude from the first flange 320 by a predetermined thickness d2. That is, an axial length of the mounting bush 340 may be greater than a thickness of the first flange 320.

Since the second end 343 protrudes from the first flange 320 in this way, the head portion 412 of the first mounting bolt 410 coupled through the mounting bush 340 may be prevented from directly contacting the first flange 320.

Referring to FIGS. 5 and 7, the coupling structure of a second flange 330 of the reservoir assembly 300 and the top surface 102 of the hydraulic block 100 may be confirmed.

The second flange 330 according to the present embodiment is spaced apart from the top surface 102 of the hydraulic block 100 by a predetermined distance d1 and is coupled to the hydraulic block 100 by the second mounting bolt 420.

The reservoir assembly 300 according to the present embodiment may be formed of a resin material by injection molding, preferably a polypropylene material. The reservoir assembly 300 injection-molded from the resin in this way may undergo shrink deformation.

When the reservoir assembly 300 is mounted on the hydraulic block 100, in order to prevent leakage of brake oil, the plurality of oil ports 319 provided on the first surface 304 of the reservoir assembly 300 need to be closely mounted to the reservoir connection port provided on the hydraulic block 100. In this case, when the reservoir assembly 300 is mounted on the hydraulic block 100 based on the plurality of oil ports 319 provided on the first surface 304, interference may occur between the second surface 305 of the reservoir assembly 300 and the top surface 102 of the hydraulic block 100 due to the shrinkage of the reservoir assembly 300, and thus the mounting of the reservoir assembly 300 may not be possible.

The reservoir assembly 300 according to the present embodiment may be designed such that the second flange 330 and the top surface 102 of the hydraulic block 100 are spaced apart by the predetermined distance d1 to ensure clearance, thereby enabling the assembly even when the reservoir assembly 300 is deformed by shrinkage. Preferably, the second flange 330 of the reservoir assembly 300 and the top surface 102 of the hydraulic block 100 may be spaced apart by about 1 mm. Since the second flange 330 and the top surface 102 of the hydraulic block 100 are spaced apart in this way, the second flange 330 may be coupled to the hydraulic block 100 by the second mounting bolt 420 even when the injection molded reservoir assembly 300 is deformed by shrinkage.

In order to couple the second flange 330 and the hydraulic block 100 that are spaced apart in this way, the second mounting bolt 420 may be provided in a stepped form.

Referring to FIGS. 5 and 7, the second mounting bolt 420 according to the present embodiment may include a threaded portion 421 and a head portion 422. In this case, the head portion 422 includes a protrusion 423 formed on an end, and a connecting portion 424 connecting the protrusion 423 and the threaded portion 421. In this case, the connecting portion 424 has a diameter smaller than the protrusion 423.

Meanwhile, the second through-hole 331 through which the step-type second mounting bolt 420 is coupled may also be provided in a stepped form. The second through-hole 331 according to the present embodiment includes a large diameter portion 332 formed on an upper side, and a small diameter portion 333 formed on a lower side with an inner peripheral surface having a diameter smaller than an inner peripheral surface of the large diameter portion 332.

The second mounting bolt 420 according to the present embodiment is provided in a stepped form to couple the second flange 330 to the hydraulic block 100. The head portion 422 of the second mounting bolt 420 includes the protrusion 423 having a diameter D3 larger than a diameter D1 of the connecting portion 424. Since the diameter D3 of the protrusion 423 is smaller than a diameter D4 of the large diameter portion 332 of the second flange 330, the protrusion 423 is inserted into the large diameter portion 332. However, since the diameter D3 of the protrusion 423 is larger than a diameter D2 of the small diameter portion 333 of the second flange 330, the protrusion 423 contacts an upper side of the small diameter portion 333 and fixes the second flange 330. In this case, since the diameter D1 of the connecting portion 424 is smaller than the diameter D2 of the small diameter portion 333, the connecting portion 424 may pass through the small diameter portion 333 and contact the top surface 102 of the hydraulic block 100.

The small diameter portion 333 according to the present embodiment has a height H1 lower than an axial length H2 of the connecting portion 424. Since the height H1 of the small diameter portion 333 is lower than the axial length H2 of the connecting portion 424 in this way, when the upper side of the small diameter portion 333 is in contact with the protrusion 423, the lower end of the small diameter portion 333, that is, the second surface 305, which is the lower end of the second flange 330, may be spaced apart from the top surface 102 of the hydraulic block 100.

Meanwhile, in the second mounting bolt 420 according to the present embodiment, when the threaded portion 421 is coupled to the second mounting hole 120, the connecting portion 424 may come into metallic contact with the top surface 102 of the hydraulic block 100. Since the connecting portion 424 of the second mounting bolt 420 comes into metallic contact with the top surface 102 of the hydraulic block 100 in this way, the second mounting bolt 420 may be firmly screw-coupled to the hydraulic block 100 and the coupling force may be maintained.

Figure 8:
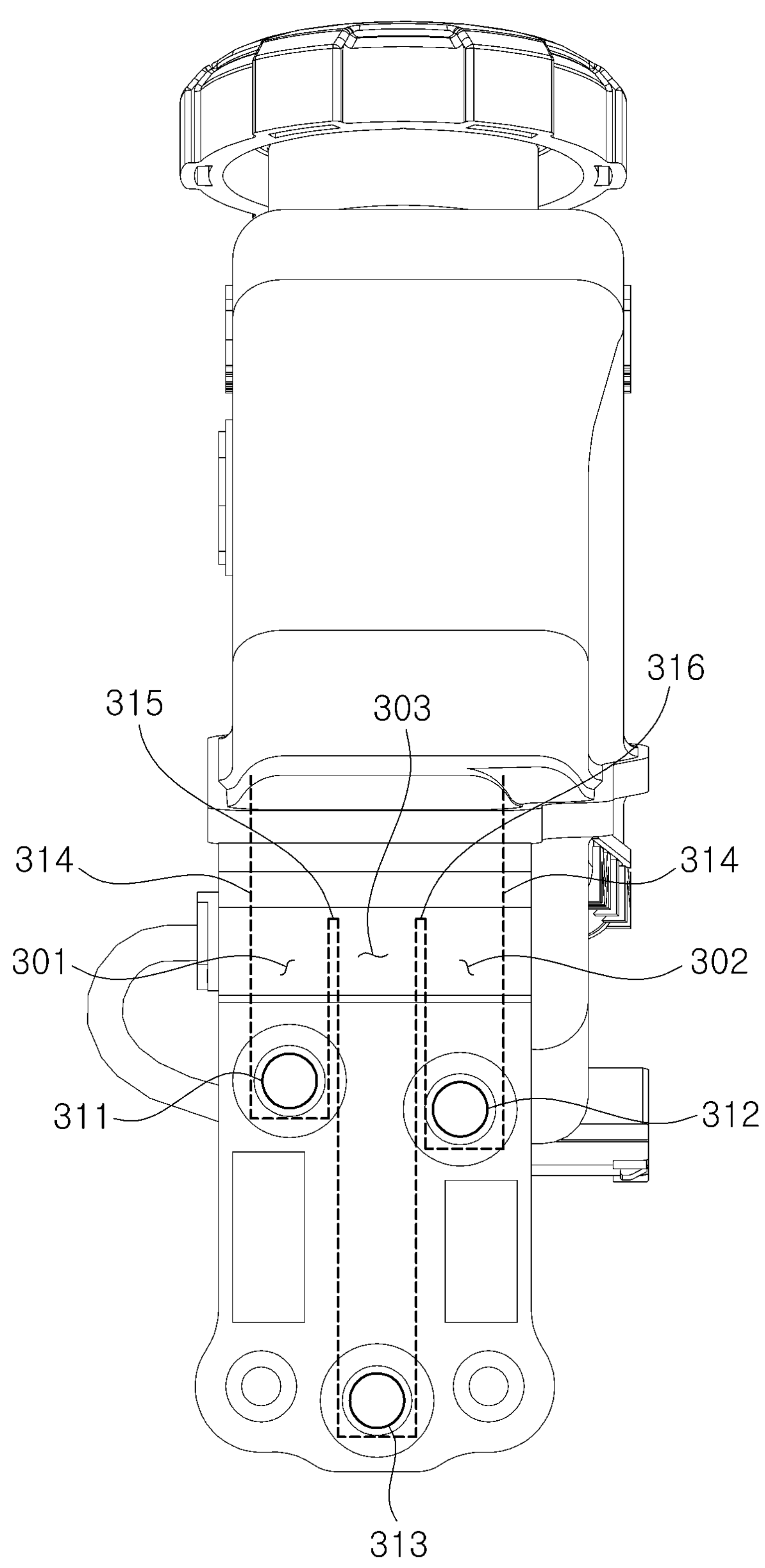
FIG. 8 is a rear view illustrating a structure of a main reservoir chamber and an oil port of a front-mounted type reservoir assembly according to one embodiment of the present disclosure.
Figure 9:
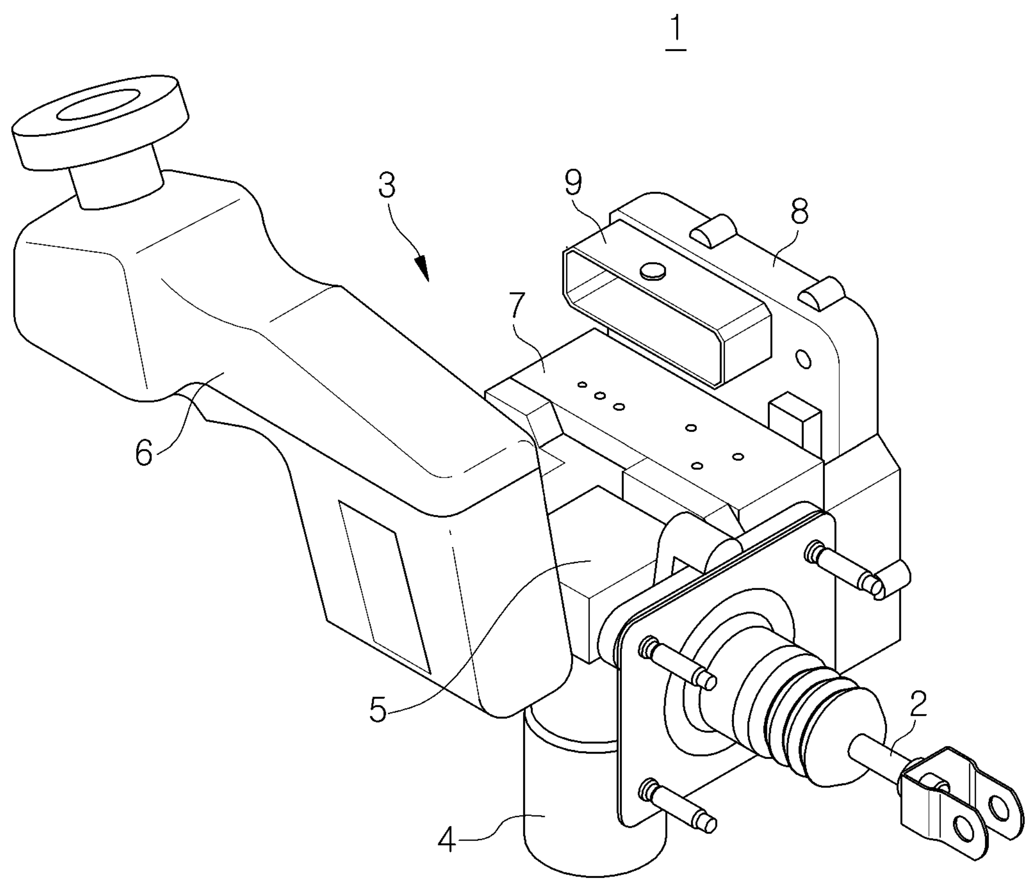
FIG. 9 is a combined perspective view illustrating an assembly structure of an electronic brake system according to the relation art.

FIG. 8 is a rear view illustrating a structure of a main reservoir chamber and an oil port of the front-mounted type reservoir assembly according to one embodiment of the present disclosure.

Referring to FIG. 8, the reservoir assembly 300 according to the present embodiment includes a main reservoir chamber that stores brake oil therein. At least one partition wall 315 or 316 is provided in a main reservoir tank to partition the main reservoir chamber into a plurality of parts.

FIG. 8 illustrates the main reservoir chamber partitioned into three parts by two partition walls 315 and 316.

The partition walls 315 and 316 may be provided to partition the main reservoir chamber into first to third reservoir chambers 301, 302, and 303. That is, as illustrated, the partition walls 315 and 316 may include a first partition wall 315 and a second partition wall 316.

The first partition wall 315 and the second partition wall 316 may be formed to be spaced apart from each other at a certain distance.

The main reservoir chamber according to the present embodiment may be provided with the first reservoir chamber 301 formed between an inner wall 314 of the main reservoir tank 310 and the first partition wall 315, the second reservoir chamber 302 formed between the inner wall 314 of the main reservoir tank 310 and the second partition wall 316, and the third reservoir chamber 303 formed between the first partition wall 315 and the second partition wall 316.

As the main reservoir chamber is divided into the first to third reservoir chambers 301, 302, and 303, the plurality of oil ports 319 may be configured to include a first oil port 311 provided to communicate with the first reservoir chamber 301, a second oil port 312 provided to communicate with the second reservoir chamber 302, and a third oil port 313 provided to communicate with the third reservoir chamber 303. Accordingly, the brake oil stored in the reservoir chambers 301, 302, and 303 may flow in and out through the respective oil ports 311, 312, and 313.

The reservoir assembly 300 according to the present embodiment includes the three oil ports 311, 312, and 313, and the oil ports 311, 312, and 313 communicate with the reservoir chambers 301, 302, and 303, respectively.

The partition walls 315 and 316 may be formed to extend vertically from a bottom surface of the main reservoir tank 310. Each of the reservoir chamber 301, 302, and 303 may be formed by the bottom surface and inner wall of the main reservoir tank 310 and the partition walls 315 and 316.

In the present embodiment, the first oil port 311 and the second oil port 312 may be connected to a first master chamber and a second master chamber of the master cylinder 20 that are formed in the hydraulic block 100, respectively, when the reservoir assembly is mounted on the hydraulic block 100, and the third oil port 313 may be connected to the hydraulic pressure generating device 52 formed in the hydraulic block 100.

Meanwhile, when the three oil ports 311, 312, and 313 are disposed on the first surface 304 as described above, in order to minimize the width in the left and right directions (F1 and F2) of the hydraulic block 100, it is desirable to vertically dispose the three oil ports 311, 312, and 313. However, since the reservoir chambers 301, 302, and 303 communicating with the oil ports 311, 312, and 313, respectively, are partitioned by the partition walls 315 and 316 extending in the vertical direction, it is not possible to vertically dispose the three oil ports 311, 312, and 313.

Accordingly, in the reservoir assembly 300 according to the present embodiment, the third oil port 313 is disposed at a position lower than the first oil port 311 and the second oil port 312 on the first surface 304.

As illustrated in FIG. 8, since the third oil port 313 communicating with the third reservoir chamber 303 is disposed at a position lower than the first oil port 311 and the second oil port 312, interference between the three oil ports 311, 312, and 313 may be prevented, and the width of the hydraulic block 100 may be minimized. In addition, since the three oil ports 311, 312, and 313 are disposed in a triangle, the oil ports 311, 312, and 313 may be stably mounted when coupled to the reservoir connection port provided in the hydraulic block 100.

Meanwhile, by disposing the third oil port 313 at the lowest position, the bottom surface of the third reservoir chamber 303 communicating with the third oil port 313 is also formed at a low position, and the volume of the third reservoir chamber 303 becomes larger than the volume of the first reservoir chamber 301 or the volume of the second reservoir chamber 302.

In this case, the third oil port 313 may be coupled to the reservoir connection port connected to the dump flow path 55 communicating with the hydraulic pressure generating device 52 of the hydraulic block 100.

That is, the third reservoir chamber 303 communicating with the hydraulic pressure generating device 52 that requires the largest capacity has the largest volume, thereby improving braking stability.

Meanwhile, the first oil port 311 and the second oil port 312 according to the present embodiment may be disposed at different heights on the first surface 304.

Since the first oil port 311 and the second oil port 312 are also disposed at different heights in this way, interference between the first oil port 311 and the second oil port 312 may be prevented and the distance between the oil ports 311, 312, and 313 in the width direction may be minimized.

As is apparent from the above description, a front-mounted type reservoir assembly of an electronic brake system according to the present embodiment can be firmly mounted on a front of a hydraulic block.

The front-mounted type reservoir assembly of an electronic brake system according to the present embodiment can secure an installation space for a connector when installed in a vehicle.

The front-mounted type reservoir assembly of an electronic brake system according to the present embodiment can have a plurality of oil ports with different heights, thereby securing the volume of a reservoir chamber connected to a hydraulic pressure generating device and ensuring structural stability.

What is claimed is:

1. A front-mounted type reservoir assembly installed on a front of a hydraulic block of an integrated brake system, comprising:

a main reservoir tank provided with a main reservoir chamber in which brake oil is stored, and provided with a plurality of oil ports through which the brake oil flows in and out on a first surface facing the front of the hydraulic block;

wherein:

the plurality of oil ports includes a first oil port, a second oil port and a third oil port, and the third oil port is disposed at a position lower than the first oil port and the second oil port on the first surface.

2. The front-mounted type reservoir assembly according to claim 1, wherein at least one partition wall is provided in the main reservoir tank to partition the main reservoir chamber into a plurality of parts, and the main reservoir chamber is provided with a first reservoir chamber formed between an inner wall of the main reservoir tank and a first partition wall, a second reservoir chamber formed between the inner wall of the main reservoir tank and a second partition wall, and a third reservoir chamber formed between the first partition wall and the second partition wall.

3. The front-mounted type reservoir assembly according to claim 2, wherein the first oil port communicates with the first reservoir chamber, the second oil port communicates with the second reservoir chamber, and the third oil port communicates with the third reservoir chamber.

4. The front-mounted type reservoir assembly according to claim 3, wherein the first oil port and the second oil port are disposed at different heights on the first surface.

5. The front-mounted type reservoir assembly according to claim 3, wherein the first oil port and the second oil port are connected to a first master chamber and a second master chamber of the master cylinder that are formed in the hydraulic block, respectively, when mounted on the hydraulic block, and the third oil port is connected to a hydraulic pressure generating device formed on the hydraulic block when mounted on the hydraulic block.

6. The front-mounted type reservoir assembly according to claim 1, further comprising:

a first flange in which at least one first through-hole through which a first mounting bolt extending from the first surface and coupled to the front of the hydraulic block is coupled is formed; and a second flange in which at least one second through-hole through which a second mounting bolt extending from a second surface facing a top surface of the hydraulic block and coupled to the top surface of the hydraulic block is coupled is formed, wherein a mounting bush with which the first mounting bolt is in contact is provided at an edge of the first through-hole.

7. The front-mounted type reservoir assembly according to claim 6, wherein the mounting bush includes a metallic material.

8. The front-mounted type reservoir assembly according to claim 6, wherein the mounting bush is formed integrally with the first flange through insert injection.

9. The front-mounted type reservoir assembly according to claim 8, wherein the mounting bush has a separation prevention protrusion formed on an outer peripheral surface thereof.

10. The front-mounted type reservoir assembly according to claim 6, wherein the mounting bush is disposed so that a first end in contact with the front of the hydraulic block is aligned with the first surface.

11. The front-mounted type reservoir assembly according to claim 10, wherein the mounting bush is disposed so that a second end opposite to the first end protrudes from the first flange.

12. The front-mounted type reservoir assembly according to claim 6, wherein the second flange is spaced apart from the top surface of the hydraulic block and coupled to the hydraulic block by the second mounting bolt.

13. The front-mounted type reservoir assembly according to claim 12, wherein the second mounting bolt includes a threaded portion and a head portion, and the head portion includes a protrusion formed on an end, and a connecting portion that connects the protrusion and the threaded portion and has a diameter smaller than the protrusion.

14. The front-mounted type reservoir assembly according to claim 13, wherein the second through-hole includes a large diameter portion formed on an upper side and a small diameter portion formed on a lower side with an inner peripheral surface having a diameter smaller than an inner peripheral surface of the large diameter portion, the small diameter portion has a diameter larger than the connecting portion and smaller than the protrusion, and the large diameter portion has a diameter larger than the protrusion.

15. The front-mounted type reservoir assembly according to claim 14, wherein the small diameter portion has a height lower than an axial length of the connecting portion.

16. The reservoir assembly according to claim 1, wherein the main reservoir tank is formed of a resin material by injection molding.

17. An electronic brake system comprising:

a hydraulic block in which a plurality of accommodating bores where a master cylinder, a plurality of valves, and a hydraulic pressure generating device are installed to control braking hydraulic pressure supplied to a wheel cylinder installed on each wheel of a vehicle and a flow path connecting each accommodating bore are formed;

a front-mounted type reservoir assembly installed on a front of the hydraulic block; and an electronic control unit coupled to one side of the hydraulic block, wherein the front-mounted type reservoir assembly includes:

a main reservoir tank provided with a main reservoir chamber in which brake oil is stored, and provided with a plurality of oil ports through which the brake oil flows in and out on a first surface facing the front of the hydraulic block;

wherein:

the plurality of oil ports includes a first oil port, a second oil port and a third oil port, and the third oil port is disposed at a position lower than the first oil port and the second oil port on the first surface.

18. The electronic brake system according to claim 17, wherein the front-mounted type reservoir assembly further includes:

a first flange in which at least one first through-hole through which a first mounting bolt extending from the first surface and coupled to the front of the hydraulic block is coupled is formed; and a second flange in which at least one second through-hole through which a second mounting bolt extending from a second surface facing a top surface of the hydraulic block and coupled to the top surface of the hydraulic block is coupled is formed, and wherein a mounting bush with which the first mounting bolt is in contact is provided at an edge of the first through-hole.

19. The electronic brake system according to claim 18, wherein the second flange is spaced apart from the top surface of the hydraulic block and coupled to the hydraulic block by the second mounting bolt.

20. The electronic brake system according to claim 17, wherein the electronic control unit is provided with a connector that is electrically connected to an external device, and the connector is disposed above the hydraulic block.

* * * * *